(12) United States Patent
Bouat et al.

(10) Patent No.: US 7,085,960 B2
(45) Date of Patent: Aug. 1, 2006

(54) COMMUNICATION SYSTEM AND METHOD

(75) Inventors: Sebastien Bouat, Crolles (FR); Philippe Wieczorek, St. Ismier (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 551 days.

(21) Appl. No.: 10/284,050

(22) Filed: Oct. 29, 2002

(65) Prior Publication Data

US 2003/0101372 A1 May 29, 2003

(30) Foreign Application Priority Data

Oct. 30, 2001 (EP) .................................. 01410140

(51) Int. Cl.
*G06F 11/00* (2006.01)
(52) U.S. Cl. .......................................... 714/13; 714/11
(58) Field of Classification Search ................. 714/13, 714/12, 11
See application file for complete search history.

(56) References Cited

U.S. PATENT DOCUMENTS

| | | | | |
|---|---|---|---|---|
| 5,581,600 | A | 12/1996 | Watts et al. ................... 379/67 |
| 5,884,262 | A | 3/1999 | Wise et al. ................... 704/270 |
| 6,128,653 | A | 10/2000 | del Val et al. ................ 709/219 |
| 6,229,804 | B1 * | 5/2001 | Mortsolf et al. .............. 370/352 |
| 6,298,324 | B1 | 10/2001 | Zuberec et al. ............... 704/251 |
| 6,396,907 | B1 | 5/2002 | Didcock ................... 379/88.17 |
| 6,400,806 | B1 | 6/2002 | Uppaluru ................. 379/88.02 |
| 6,693,874 | B1 * | 2/2004 | Shaffer et al. ............... 370/217 |
| 6,738,343 | B1 * | 5/2004 | Shaffer et al. ............... 370/216 |
| 6,751,297 | B1 | 6/2004 | Nelkenbaum ............ 379/88.13 |
| 6,785,223 | B1 * | 8/2004 | Korpi et al. ................. 370/218 |
| 2002/0101860 | A1 * | 8/2002 | Thornton et al. ........... 370/352 |
| 2002/0107966 | A1 * | 8/2002 | Baudot et al. .............. 709/227 |
| 2003/0012178 | A1 * | 1/2003 | Mussman et al. ........... 370/352 |
| 2003/0088421 | A1 | 5/2003 | Maes et al. ............... 704/270.1 |
| 2003/0101222 | A1 | 5/2003 | Lyonnaz ..................... 709/205 |
| 2003/0103494 | A1 | 6/2003 | Lyonnaz ..................... 370/352 |
| 2003/0133545 | A1 | 7/2003 | Rosset ..................... 379/93.01 |
| 2004/0076274 | A1 | 4/2004 | Anselmetti et al. ...... 379/88.22 |
| 2004/0190442 | A1 * | 9/2004 | Lee ........................... 370/217 |
| 2005/0058061 | A1 * | 3/2005 | Shaffer et al. .............. 370/216 |

FOREIGN PATENT DOCUMENTS

| | | |
|---|---|---|
| EP | 1 026 918 A2 | 8/2000 |
| EP | 1 047 241 A2 | 10/2000 |
| EP | 1 056 256 A2 | 11/2000 |
| WO | 01/30046 A2 | 4/2001 |
| WO | 01/47218 A1 | 6/2001 |
| WO | 01/52477 A2 | 7/2001 |

\* cited by examiner

*Primary Examiner*—Dieu-Minh Le

(57) ABSTRACT

The present invention relates to a communication system and method and, more particularly, to a fault tolerant network element for providing fault tolerant call connections in the event of a failure of, for example, a Gatekeeper or other part of a network. Calls set up across a network consume large amounts of resources both throughout the network and at the devices which form the end points of the network. Therefore, even though a call connection may be supported, in the event of the failure of a network element, it is often the case that there is an ungraceful failure or use of resources throughout the network. Accordingly, an aspect of the present invention provides a method for preserving a connection context at a first layer of a communication protocol; the communication protocol comprising a second, higher, signalling layer in which, in response to a switch-over from an active host to a standby host in the event of failure of the former, the connection is terminated in response to receipt of a signalling layer signal other than a disconnect or terminate signal.

14 Claims, 10 Drawing Sheets

300

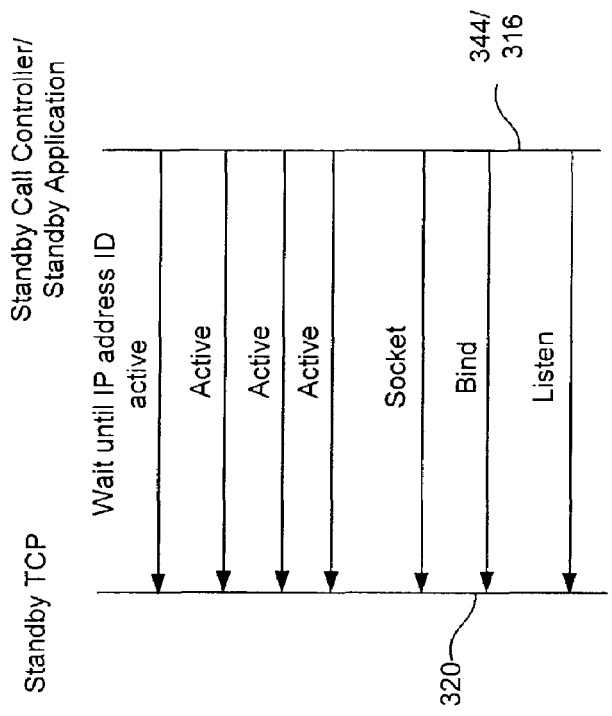
FIGURE 9(a)
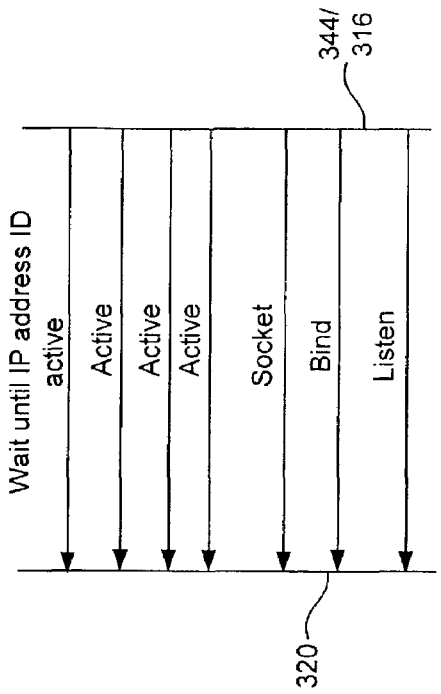
FIGURE 9(b)
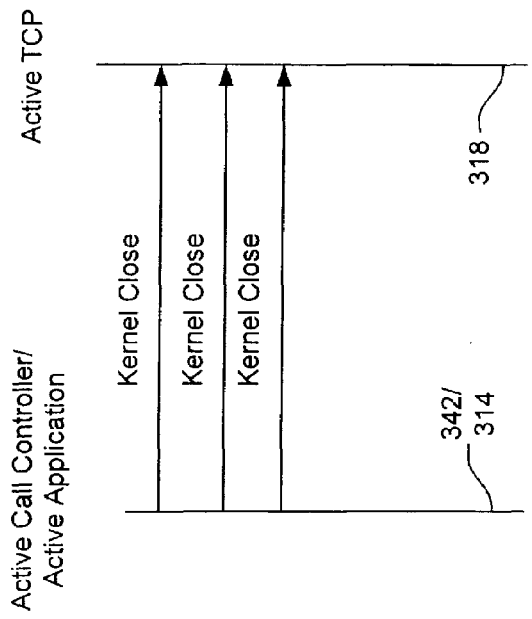
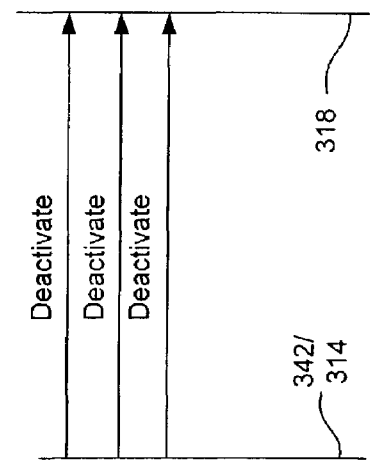

COMMUNICATION SYSTEM AND METHOD

FIELD OF THE INVENTION

The present invention relates to a communication system and method and, more particularly, to a high availability or fault tolerant network element.

BACKGROUND TO THE INVENTION

With the ubiquitous nature and ever increasing popularity of the Internet and with the use of the Internet to support, for example, telephony services, known, as IP telephony services or voice over IP (VOIP), there is a need to provide high availability network equipment to support such voice services. A high availability service aims to provide service continuity in that the telephony service is available both before and after a system failure. A break in the support of the voice service of, for example, 300 milliseconds will be perceivable by a human and will degrade the quality of the service of the link. These high availability systems are implemented using gatekeepers, as is known within the art.

In the case of failure of the gatekeeper typically all calls are torn down. This results in all parties being unable to communicate without prior notice. Clearly such an abrupt disruption is undesirable Suitably, it is known within the art to provide fault tolerant H.323 gatekeepers in which a gatekeeper function is supported using active and stand-by hosts. The active gatekeeper manages the call set-up, tear-down and other telephony functions for all associated calls. The stand-by gatekeeper is ready to assume the role of active gatekeeper in the event of a fault with the current active gatekeeper.

To implement call preservation using a connection-oriented protocol would require providing a highly available protocol stack. Conventional wisdom directs one skilled in the art, when contemplating implementing a highly available system, to design and develop software that preserves a protocol stack. Providing such a highly available protocol stack, which includes connection layer information, such as IP and TCP layers, and signalling layers such as H.323 or Q.931 and other application layers represents an enormous design and development overhead during the production of the system. Additionally, the amount of system resources required to preserve such a protocol stack would reduce the performance of the system since a significant amount of memory, data processing and CPU power would be consumed during any such protocol stack preservation.

It is an object of the present invention at least to mitigate some of the problems of the prior art.

SUMMARY OF INVENTION

Accordingly, a first aspect of the present invention provides a method of processing a data connection for exchanging data between two communication devices within a fault tolerant apparatus having an active host and a stand-by host; the active host being arranged to support a communication protocol stack comprising at least a first protocol layer, providing connection management signals, for establishing and managing the data connection between the two communication devices, including a disconnect signal for terminating the connection, and a second protocol layer having an associated connection context; the first protocol layer being at a higher level within the communication protocol stack relative to the second protocol layer; the method comprising the steps of establishing a data connection between the two communication devices using at least the connection management signals of the first protocol layer and establishing a connection context for the second protocol layer;

replicating the connection context of the second protocol layer to the stand-by host;

implementing the communication stack protocol on the standby host in response to detection of an event associated with the active host;

receiving, at the standby host, from one of the two communication devices, an associated connection management signal other than a disconnect signal; and issuing to at least one of the two communication devices a disconnect signal in response to receipt of the associated call management signal.

Advantageously, since the call traffic, which is maintained using a transport mechanism such as TCP/IP, and the call set-up, tear-down and other signalling etc. are carried by different channels or connections, having established a call connection, the next signal expected to be received by the fault tolerant apparatus or network element is very likely to be a tear-down signal. Therefore, the likelihood of inadvertently tearing down a call which should have remained established, outweighs the additional processing burden that is ordinarily required to preserve a call.

Still further advantages of the present invention reside in the reduced system resources that are required to provide protocol stack preservation and, in particular, in preferred embodiments, H.323 high availability.

Since only a portion of the protocol stack is preserved, that is the connection layer data is preserved, while the signalling layer information is not preserved, the system resources are not consumed by attempting to preserve the siganlling data following a failure of a host. Accordingly, the performance of the system is improved in terms of, for example, the number of calls per second that can be made or the number of simultaneous calls that can be supported.

Terminating the calls, following a switch-over from an active host to a standby host, upon receipt of the next call management signal, allows one skilled in the art to provide a system having a highly available protocol stack. Still further, since each of the end-points are informed of the termination, the network resources and system resources are freed in an orderly manner, without the need to rely upon time out processes.

It will be appreciated that typically an ungraceful call or connection termination results in network and end-point resources being consumed for longer than they are needed. This excessive use or tying up of network resources leads to a decrease in performance of the network and the connection management apparatus.

Hence, preferred embodiments of the present invention provide a method further comprising the step of terminating the data connection at at least one of the two communication devices in response to receiving the disconnect signal issued by the fault tolerant apparatus.

The receipt of a disconnect signal causes the end-points to free the resources that were used to support the data connection. Furthermore, the resources at the fault tolerant apparatus can also be released. This allows the performance of the fault tolerant apparatus to be improved.

Preferably, an embodiment provides a method in which the step of establishing a connection context comprises storing data relating to at least one of a signalling connection between the apparatus and at least one of the two communication devices and the data connection between the two communication devices.

It will be appreciated that, in the event of the failure of a network element which carries both the connection data and the signalling data, the call and the means of establishing and maintaining the call are lost. Accordingly, preferred embodiments provide a method in which the data connection between the two communication devices is supported using a network element other than the fault tolerant apparatus.

The present invention finds particular application in connection-oriented protocols. Suitably, an embodiment provides a method in which the first protocol layer is an H.323 layer. Furthermore, an embodiment provides a method in which the second protocol layer is a packet-based protocol layer such as, for example, a TCP layer.

A second aspect of the present invention provides a fault tolerant apparatus for supporting a data connection for exchanging data between two communication devices; the apparatus comprising an active host and a stand-by host; the active host being arranged to support a communication protocol stack comprising at least a first protocol layer, providing connection management signals, for establishing and managing the data connection between the two communication devices, including a disconnect signal for terminating the connection, and a second protocol layer having an associated connection context; the first protocol layer being at a higher level within the communication protocol stack relative to the second protocol layer;

a first signal manager for establishing a data connection between the two communication devices using at least the connection management signals of the first protocol layer and establishing the associated connection context for the second protocol layer;

a connection data replication module for replicating the connection context of the second protocol layer to the stand-by host;

a second signal manager for implementing the communication stack protocol on the standby host in response to detection of an event associated with the active host;

a receiver for receiving, at the standby host, from one of the two communication devices, an associated connection management signal other than a disconnect signal; and a transmitter for issuing to at least one of the two communication devices a disconnect signal in response to receipt of the associated call management signal.

A further aspect of the present invention provides a computer program element comprising computer program code for implementing a method or system as described herein. A still further aspect of the present invention provide a computer program product having a computer readable storage medium having stored thereon the above-described computer program element.

BRIEF DESCRIPTION OF THE DRAWINGS

Embodiments of the present invention will now be described, by way of example only, with reference to the following accompanying drawings in which:

FIGS. 9(*a*) and 9(*b*) illustrate the processes that are performed by an embodiment upon the death of a process or a manual transfer of connections from an active host to a stand-by host.

DESCRIPTION OF THE PREFERRED EMBODIMENTS

Figure 1:
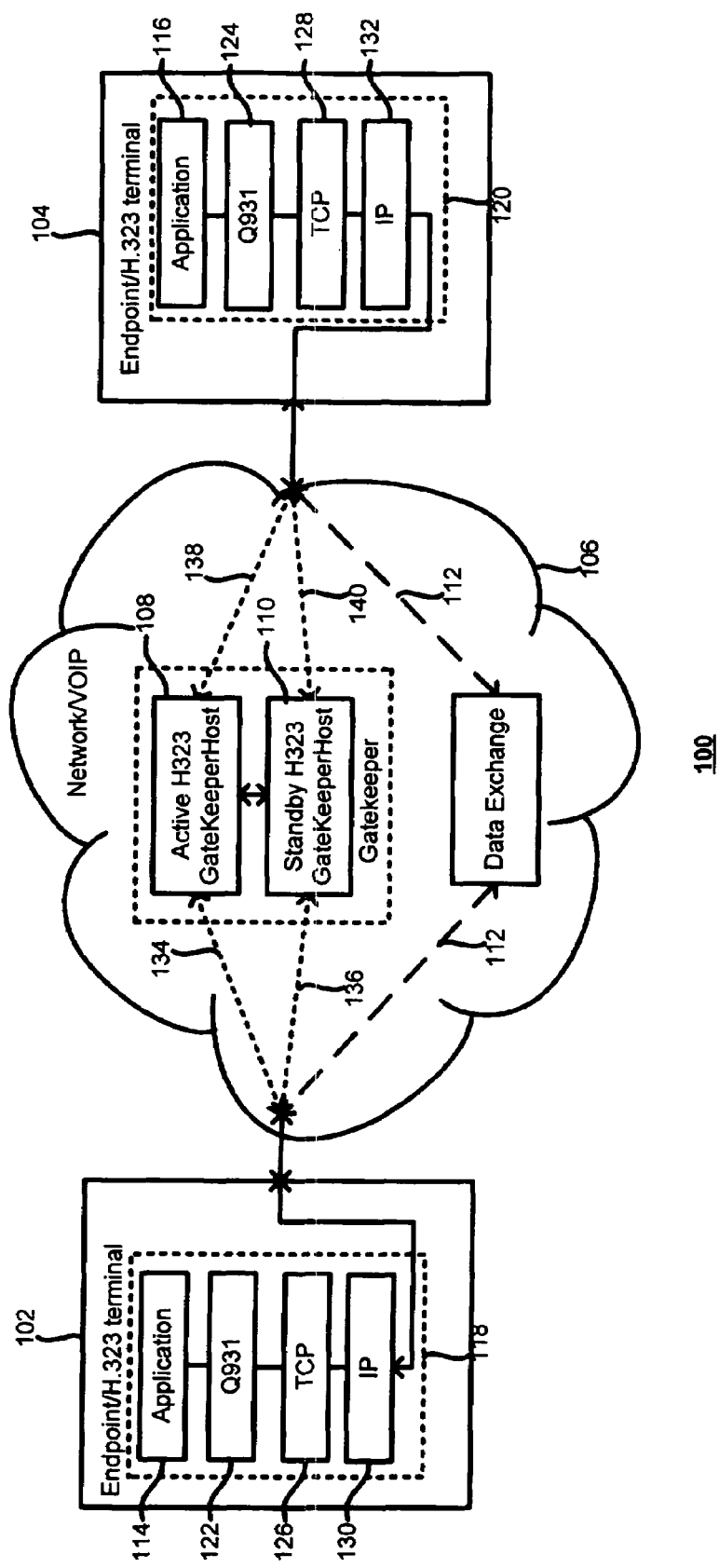
FIG. 1 illustrates a communication system in accordance with the prior art.

Referring to FIG. 1 there is shown a communication system 100 comprising first 102 and second 104 H.323 terminals or end points. The end points 102 and 104 may be, for example, IP-telephones or computers, that is, the H.323 terminals can either be a PC or a stand-alone device running an H.323 stack or application. The end points 102 and 104 are connected to an IP network 106. The IP network 106 comprises at least two gatekeeper hosts 108 and 110 for supporting a gatekeeper. The gatekeeper hosts are operated in active and stand-by modes. Preferably, the gatekeeper is an H.323 Gatekeeper that is used to establish an IP call or connection 112 between the end points 102 and 104.

Each of the end points 102 and 104 has an application 114 and 116 that controls the IP telephony functions of the end points 102 and 104, that is, each have an H.323 application.

An end point or H.323 terminal provides real-time, two-way communication with another H.323 terminal, Gateway or Multipoint Control Unit (MCU). Any such communication consists of control, indications, audio, video pictures, and/or data between the terminals.

As is known within the art, the call control functions that set-up, tear-down and otherwise manage the call connection 112 are routed and processed by the gatekeeper using the active gatekeeper host 108. In the event of failure, for whatever reason, hardware or software, of the active gatekeeper host 108, the stand-by gatekeeper host 110 assumes responsibility for call connection management by providing supporting gatekeeper functionality. However, as is known within the art, all calls that are currently in progress, that is, all calls that were currently managed by the gatekeeper running on the active gatekeeper host 108, at the point of failure, are lost. Any further established calls are handled by the gatekeeper running on the stand-by gatekeeper host 110 which, in effect, becomes the active gatekeeper host.

The end points interact with the gatekeeper and each other via respective communication stacks 118 and 120. The communications stacks comprise Q.931 layers 122 and 124, TCP layers 126 and 128 and IP layers 130 and 132. The operation of the various layers 122 to 132 of the respective communication stacks 118 and 120 are well known within the art.

It will be appreciated that the call management signalling and the data exchanged between the end points 102 and 104 are conveyed via separate connections. The call management signalling is conveyed by links or connections 134, 136, 138 and 140 with the active and stand-by gatekeeper hosts 108 and 110 whereas the data packets exchanged between the end points 102 and 104 are carried by a separate connection 112. Essentially, the gatekeepers of a network are used to admit an end point to the network and to then establish or at least assist in establishing a connection between the end points. It will be appreciated that a gatekeeper is an H.323 entity within the network 106 that provides address translation and controls access to the network for the end points. The end points are also known within the art as H.323 terminals. Additionally, the end points may include Gateways and MCUs. The gatekeepers may also provide other services to the end points etc such as bandwidth management and the location of Gateways.

Figure 2:
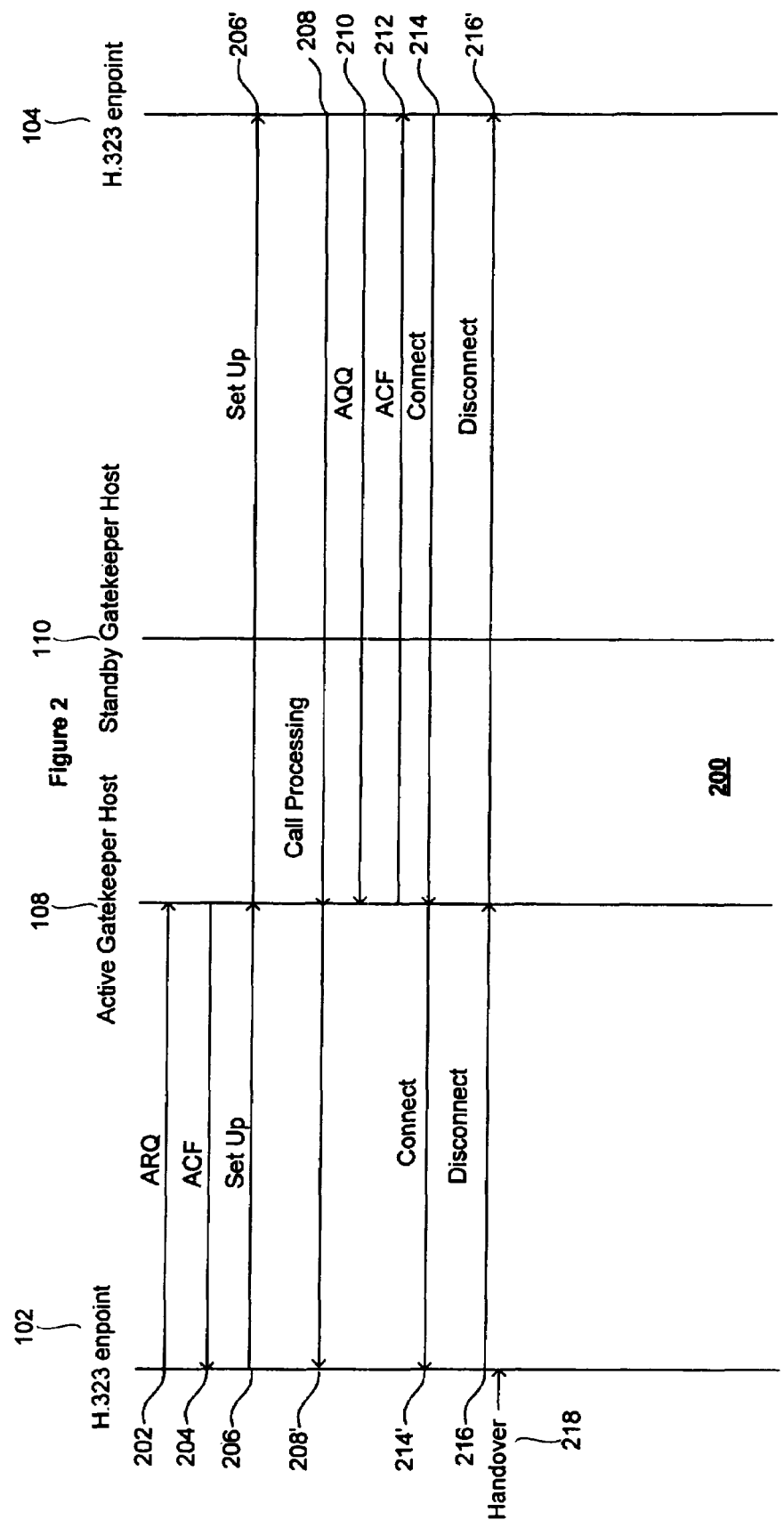
FIG. 2 depicts telephony signalling required to support a call connection between the two end points shown FIG. 1.

Referring to FIG. 2 there is shown schematically a signalling diagram 200 of the signals that are exchanged between the end points 102 and 104 and the active 108 and stand-by 110 Gatekeepers to set-up and tear-down a call.

To establish a call or connection the first end point 102 issues an admission request signal 202 to the gatekeeper running on the active gatekeeper host 108. The gatekeeper of the active gatekeeper host 108 replies with an admission confirm command signal 204. The admission request and admission confirm signals are exchanged using RAS channels. In response to receipt of the admission confirm signal 204, the end point issues a Q.931 set-up signal 206 and 206'. that is routed via the gatekeeper running on the active gatekeeper host 108 to the second end point 104. It will be appreciated that H.225 contains a subset of Q.931. The second end point 104 replies with a Q.931 call proceeding signal 208. Also, the second end point 104 issues an admission request signal (ARQ) 210 to the gatekeeper running on the active gatekeeper host. The gatekeeper running on the active gatekeeper host 108 responds with an ACF signal 212. In response to receiving the ACF signal 212, the second end point 104 issues a Q.931 connect signal 214 to the gatekeeper running on the active gatekeeper host 108, which forwards a corresponding connect signal 214' to the first end point 102.

Either end point may terminate a connection with the other end point by issuing a disengage request or disconnect signal 216. It can be seen in the example shown that the first end point 102 has issued a disconnect signal 216. The disconnect signal is received via the gatekeeper running on the active gatekeeper host 108, which then forwards a corresponding signal 216 to the second end point.

It will be appreciated by those skilled in the art that the signalling which takes place between the first and second end points 102 and 104, via the gatekeeper running on the active gatekeeper host 108, is to establish a VOIP or other data connection between the end points via some other transport mechanism such as TCP/IP or RTP.

Still referring to FIG. 2 assume that the gatekeeper running on the active gatekeeper host 108 fails at some point in time. The failure may be attributed to failure of the gatekeeper software or a software or hardware failure of the active host on which the gatekeeper is running. At that point in time a hand-over process 218 is instigated such that the current gatekeeper running on the active gatekeeper host 108, as a consequence of some form of failure, no longer functions as such. The stand-by gatekeeper host 110, in the event of any such failure of the active gatekeeper host 108, becomes the current active gatekeeper host by running a gatekeeper function. Within the prior art, in the absence of any IP address migration, described in greater detail hereafter, all calls that were currently supported by the gatekeeper running on the gatekeeper host 108 are lost.

Figure 3:
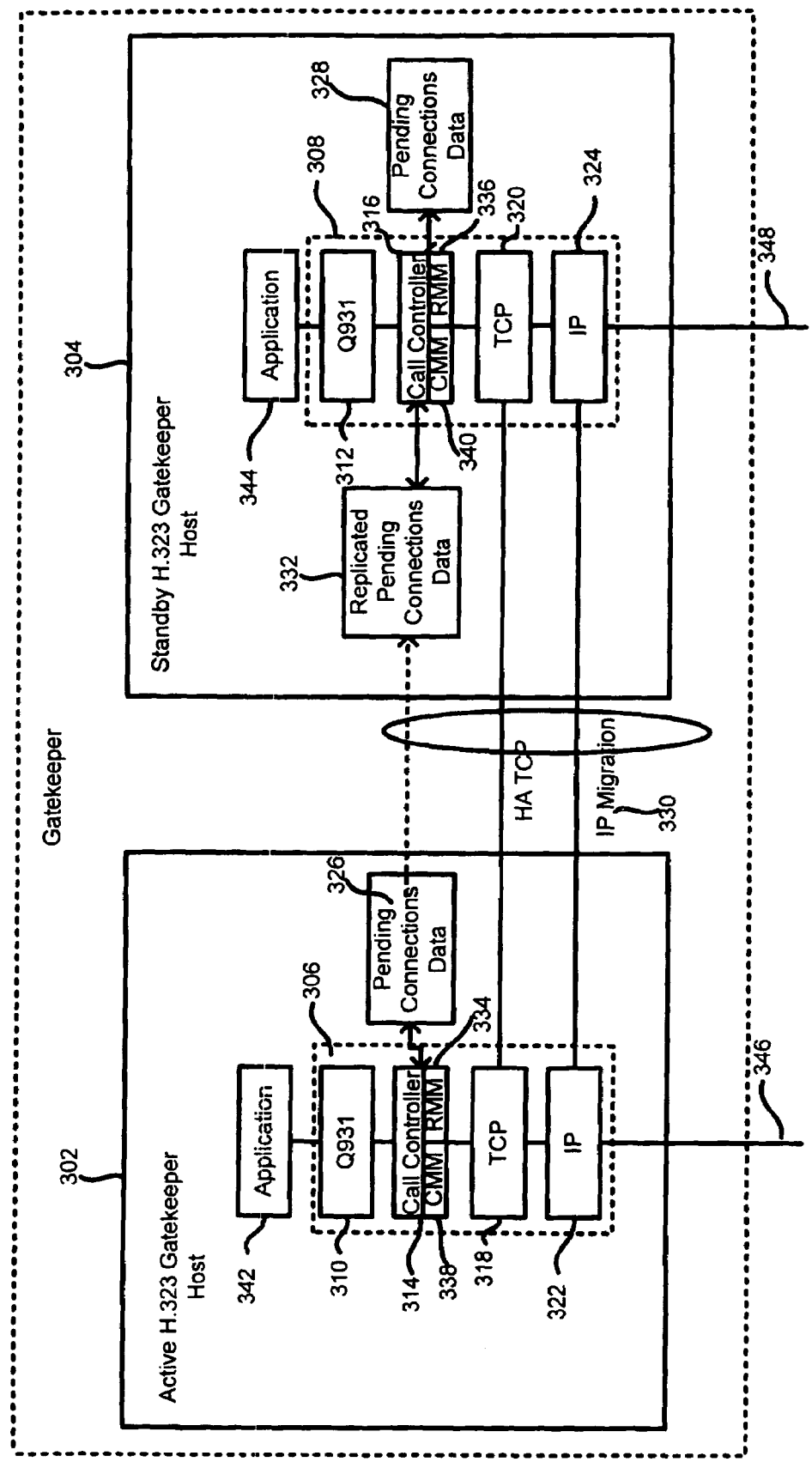
FIG. 3 illustrates a communication system comprising an H.323 gatekeeper in accordance with an embodiment of the present invention.

Referring to FIG. 3 there is shown a communication system or fault tolerant apparatus 300 in accordance with a first embodiment of the present invention which can be used to realise the gatekeeper function using active 108 and stand-by 110 gatekeeper hosts as shown in FIG. 1. The network element 300 comprises an active H.323 gatekeeper host 302 providing gatekeeper functionality, that is, running a gatekeeper, and a stand-by H.323 gatekeeper host 304. Each of the active 302 and stand-by 304 gatekeeper hosts have an H.323 stack for supporting call set-up, call teardown and implementing other call management functionality with the end points (not shown) and for exchanging data between the gatekeeper hosts. Each of the H.323 stacks 306 and 308 comprise a Q.931 layer 310 and 312, a call controller layer 314 and 316 and packet transport layers which, in the preferred embodiment, are a TCP layer 318 and 320 and an IP layer 322 and 324. The active gatekeeper host 302 maintains connection details 326 that relate to pending call connection. Similarly, should the stand-by H.323 gatekeeper host 304 need to support the gatekeeper functionality by becoming the active gatekeeper host, the standby gatekeeper host 304 also maintains a list of pending call connections 328 for all calls that were set-up or established before a switch-over between the active 302 and stand-by 304 gatekeeper hosts.

Furthermore, the active gatekeeper host 302 ensures that all data 326 related to the pending connections for which the active gatekeeper host 302 has responsibility are replicated and transferred to the stand-by gatekeeper host 304 so that the management of those pending calls can be assumed by a gatekeeper launched on the stand-by gatekeeper host 304 in the event of switch-over.

It will be appreciated that the H.323 terminals should, preferably, support the following functionality:

H.245 for exchanging terminal capabilities and the creation of media channels;

H.225 for call signalling and call set-up;

RAS for registration and other admission control with a Gatekeeper; and

RTP/RTCP and/or TCP/IP for sequencing audio and/or video packets.

To the extent that audio and/or video packets are exchanged via the end points 102 and 104, those end points should preferably support the G.711 audio CODEC. Optional components include an appropriate video codec, T.120 data-conferencing protocols and MSU capabilities.

With further reference to FIG. 3, it will be appreciated that the gatekeeper, preferably, performs a call-signalling routing function in which the end points 102 and 104 send call-signalling messages to the gatekeeper, which the Gatekeeper then routes to an appropriate destination end point. It will be appreciated that routing calls via a gatekeeper improves the performance of the network 106 as a whole, as the gatekeeper can make routing decisions based on a variety of factors such as load balancing among Gateways etc.

A preferred embodiment of the present invention preferably uses IP address migration 330 and TCP/IP context preservation between the active gatekeeper host 302 and the stand-by gatekeeper host, that is, to ensure that the context is replicated at the stand-by gatekeeper host 304 to support call preservation. The IP address migration 330 and the TCP/IP context preservation manifests itself in the pending connections data 326 and 332.

The replicated call pending data 326 is stored in an identifiable manner within a predetermined region or file 332 of the stand-by gatekeeper host. It will be appreciated that the replicated data includes at least call information for two sockets, that is, one for each call leg or connection to the end points.

In the event of failure of the active gatekeeper host 302, since the IP addresses were migrated, to the stand-by gatekeeper host 304, any further call signalling such as RAS, H.225 or H.245, received from an end point will be directed to and processed by the gatekeeper launched on the recently promoted stand-by gatekeeper host 304, in effect, the stand-by gatekeeper host 304 becomes the active gatekeeper host.

If the recently promoted stand-by gatekeeper host 304 receives call set-up signals to establish a new connection between identified end points, the call processing continues in the conventional manner and a connection is negotiated between the end points (not shown) using H.245. The call controller 316, upon receiving a request for a new connection, adds to the pending connections data 328 an appropriate file descriptor that is mapped to an available IP socket. The pending connections data 328 allows the call controller 316 to determine, in the event of receipt of further call signals from the end points, an appropriate course of action.

Upon receiving a further call signal for a call connection that has a corresponding file descriptor stored within the pending connections data 328, that call signal, whatever it may be, is processed in the conventional manner according to the nature of the call signal. It will be appreciated that any such new call signal may be, for example, a call forward signal or a tear-down signal.

However, if a call signal is received from an end point for which the currently active H.323 gatekeeper host 304 does not have a corresponding identifier stored within the pending connections data 328, the call controller 316 determines whether or not the recently received call signal relates to a call that was pending at the time of failure of the old active H.323 gatekeeper host 302 by examining the replicated pending connections data 332. If the call controller 316 determines that there is a match between a identifier contained within the replicated pending connections data 332 and the identifier associated with the most recently received call signal, then, notwithstanding the type of call signal, the call connection associated with that identifier is terminated. In effect, the gatekeeper running on the active gatekeeper host 304 issues disconnect signals to the end points associated with the call determined by the identifier that was contained within the replicated pending connections data 332. It will be appreciated that this will terminate the call connection between the two end points.

Figure 4:
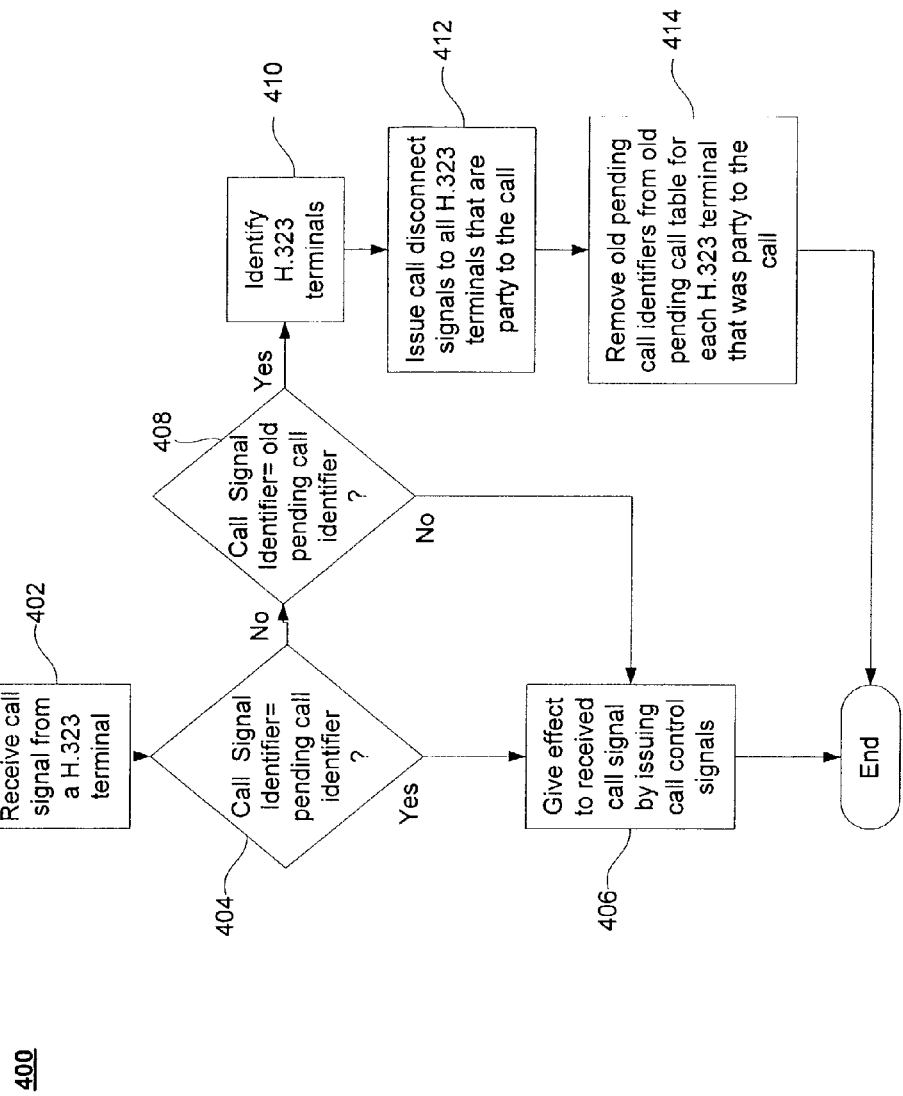
FIG. 4 depicts a flow chart showing the processing steps undertaken by a communication system according to an embodiment.

Referring to FIG. 4 there is shown a flow chart 400 of the processing undertaken by a currently active H.323 gatekeeper following a switch-over. At step 402 the currently active gatekeeper receives from an end-point a call control signal having an identifier. It is determined at step 404 whether or not the call control signal identifier corresponds to a pending call identifier or file descriptor stored in the pending connections data 328. If the call signal identifier matches one of the pending connections identifiers or file descriptors, effect is given to the received call control signal at step 406 via the gatekeeper issuing appropriate call control signals.

However, if it is determined at step 404 that the identifier does not match one of the pending connections contained within the pending connections data 328, it is determined at step 408 whether or not the call signal identifier matches one of the replicated pending connections stored within the replicated pending connections data 332. If there is no such match, the received call signal must be a new admission request or call set-up request and control passes to step 406 where effect is given to that received call control signal by the gatekeeper issuing appropriate call control signals.

If it is determined at step 408 that the call control signal identifier matches one of the replicated pending connections identifiers stored within the replicated pending connections data 332, the H.323 terminals associated with the connection to which the received call control signal relates are identified at step 410 and, at step 412, the gatekeeper running on the active gatekeeper host 304 issues call disconnect signals to at least one of and preferably all of the identified H.323 terminals that are party to the call. This will have the effect of all of the H.323 terminals terminating the connection to which the received call control signal relates. Having terminated a call connection, the replicated pending call connection identifier sstored within the old pending connections data 332 to which the received call signal relates are removed from that data 332.

Figure 5:
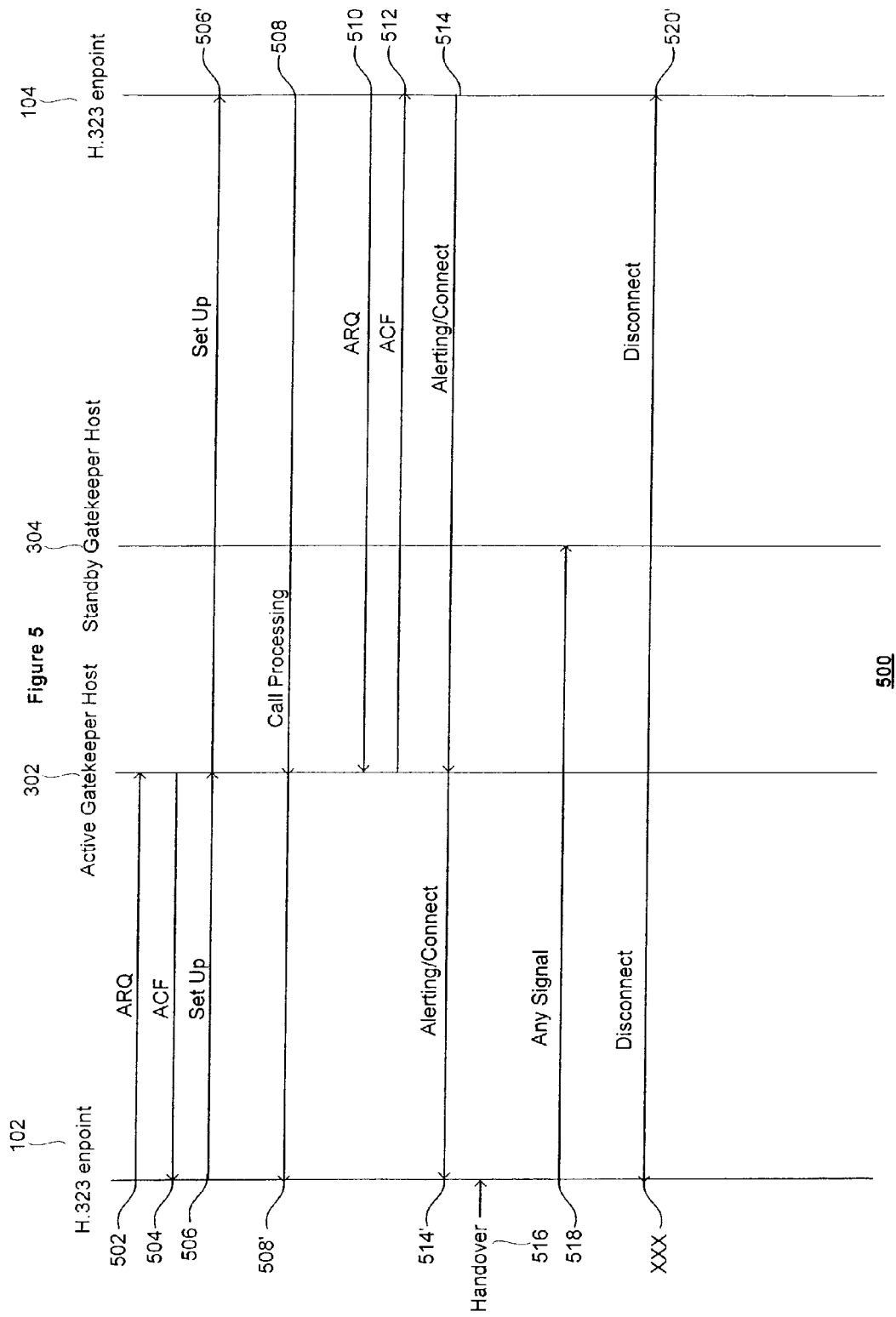
FIG. 5 shows the signalling that occurs during establishment and subsequent failure of a telephony channel between the end points.

Referring to FIG. 5 there is shown a signalling diagram 500 that illustrates the exchange between the H.323 end points 102 and 104 and the active and stand-by gatekeeper hosts 302 and 304. The first H.323 end point 102 transmits, using an RAS channel, an admission request signal 502 to the active gatekeeper 302. Assuming that the resources and bandwidth available at the active gatekeeper are sufficient, the active gatekeeper 302 replies with an admission confirm signal 504.

Upon receipt of the admission confirm signal at the H.323 end point 102, that end point transmits a set-up signal 506 to the active gatekeeper which forwards a corresponding set-up signal 506' to the second H.323 end point 104. In response to receiving the set-up signal 506', the second H.323 end point 104 transmits, using H.225 signalling, a call proceeding message 508 to the active gatekeeper. The gatekeeper running on the active gatekeeper host 302 forwards an appropriate call proceeding message 508' to the first H.323 end point 102. The second H.323 end point 104 then transmits an admission request signal 510 to the gatekeeper running on the active gatekeeper host 302. Again, assuming that sufficient resources are available, the gatekeeper running on that host 302 responds with an admission confirm signal 512. Having received the admission confirm signal 512, the second H.323 end point 104 transmits alerting and connect signals 514, in sequence, to the active gatekeeper 302. In response to receiving the alerting and connect signals 514, the gatekeeper running on the active gatekeeper host 302 transmits corresponding alerting and connect signals 514' to the first H.323 end point 102. After having set-up their H.245 logical channels the first 102 and second 104 end points can exchange data. Assuming that hand-over occurs at some point 516, it will be appreciated that the stand-by gatekeeper host 304 effectively becomes the new active gatekeeper host. Since the TCP context of the old active gatekeeper host 302 has been preserved and due to IP address migration, the connections between the first 102 and second 104 end points and the gatekeeper will not have been terminated. Therefore, the newly active or old stand-by gatekeeper host 304 can expect to receive further call control signals from either of the first 102 or second 104 H.323 end points.

Assuming that the newly active gatekeeper host 304 receives a further call control signal 518 from the first H.323 end point 102, in response to receiving that signal, no matter what type of call control signal it represents, the gatekeeper running on the newly active gatekeeper host 304 issues disconnect signals 520 and 520' to both the first 102 and second 104 H.323 end points. In response to receiving the disconnect signals 520 and 520', the first 102 and second 104 H.323 end points close their connections.

It can be appreciated that the signal received by the gatekeeper running at the newly active gatekeeper host 304 following the hand-over 516 or switch-over may be any type of signal such as a call forward signal or some other call control signal which is not a disconnect signal. However, the connection to which the received call control signal relates is terminated irrespective of the type of received call control signal 518. This course of action will on balance be acceptable to the end users since it is very probable that the next call control signal to be received by the gatekeeper would be a call tear-down or disconnect signal.

It will be appreciated that during the operation of the active and standby gatekeepers hosts only the TCP/IP connections of one of those systems will be active at any one time, that is, only one of the gatekeeper hosts will be able to receive and issue call control signals. The TCP/IP connections of the standby host are arranged so that they neither receive nor send call control signals.

A technique for preserving established TCP connections during switch-over from the active H.323 gatekeeper hosts 302 to the standby H.323 gatekeeper host 304 will now be described. As indicated above the call controllers 314 and 316 have a replication mechanism to exchange pending call connection data and status information between the active 302 and standby 304 gatekeeper hosts. In effect, the TCP context of the active gatekeeper host 302 is preserved and reflected at the standby gatekeeper host 304. It will be appreciated that the TCP context will vary dynamically as will the replication process to maintain a reflection of that TCP context at the standby gatekeeper host 304.

In the following, a TCP connection is considered to be preserved if the end point does not have to reopen that connection after a switch-over between the currently active gatekeeper host 302 and the standby gatekeeper host 304. The term "active TCP connections" will be used to refer to gatekeeper connections that can send and receive packets, that is, they will refer to the connections of a currently active gatekeeper host. The term "standby TCP connections" will refer to connections that can neither receive nor send TCP/IP packets until activated, that is, until switch-over has been effected. Each call controller 314 and 316, in a preferred embodiment, performs both connection management and replication functions by means of a replication manager module 334 and 336 and a connection module 338 and 340.

The connection manager modules 338 and 340 each present an interface used by a corresponding call controller 314 and 316 to open, configure, retrieve and update the state of the TCP/IP connections. The connection manager modules 338 and 340 shield the call controllers 314 and 316 from the details of the connection management functions. The connection manager modules 338 and 340 are also the preferred means of managing all preserved connections.

The replication manager modules 334 and 336 provide a replication service to enable the pending connections data 326 of the active gatekeeper host 302 to be replicated within the standby gatekeeper host 304.

Figure 6:
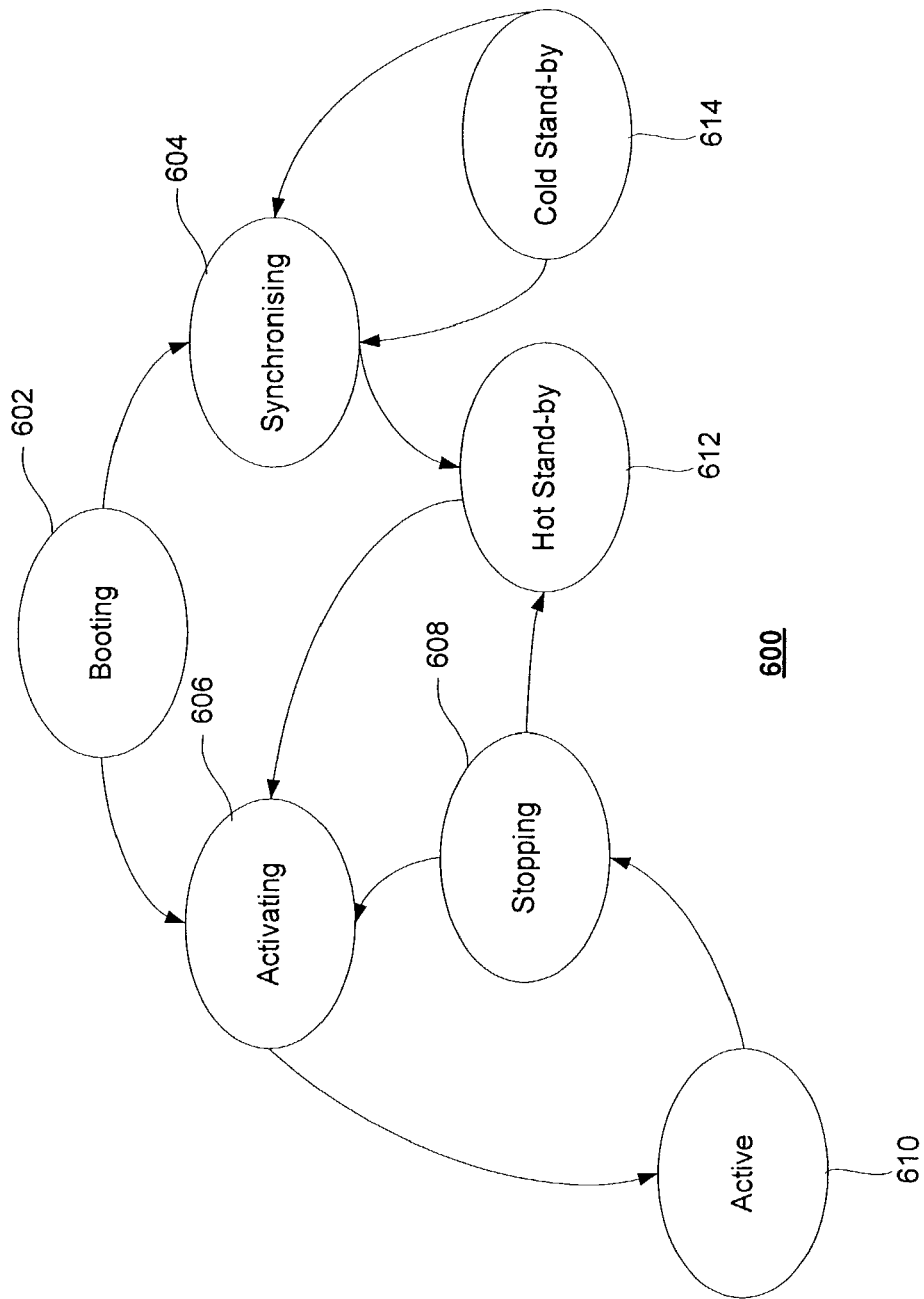
FIG. 6 illustrates a state diagram showing the states assumed by a communication system according to an embodiment.

Referring to FIG. 6 there is shown a state diagram 600 illustrating the states that can be adopted by the call controllers 314 and 316. Some of the illustrated states; namely the booting state 602, the synchronising state 604, the activating state 606 and the stopping state 608 are transient states. A process passes through those transient states only as an intermediary step before reaching a final stable state. The stable states are the active state 610, the hot standby state 612 and the cold standby state 614. It will be appreciated by those skilled in the art that a call or process can go down in any state. However, for the sake of clarity, state transitions to the down state are not shown in FIG. 6.

Figure 7:
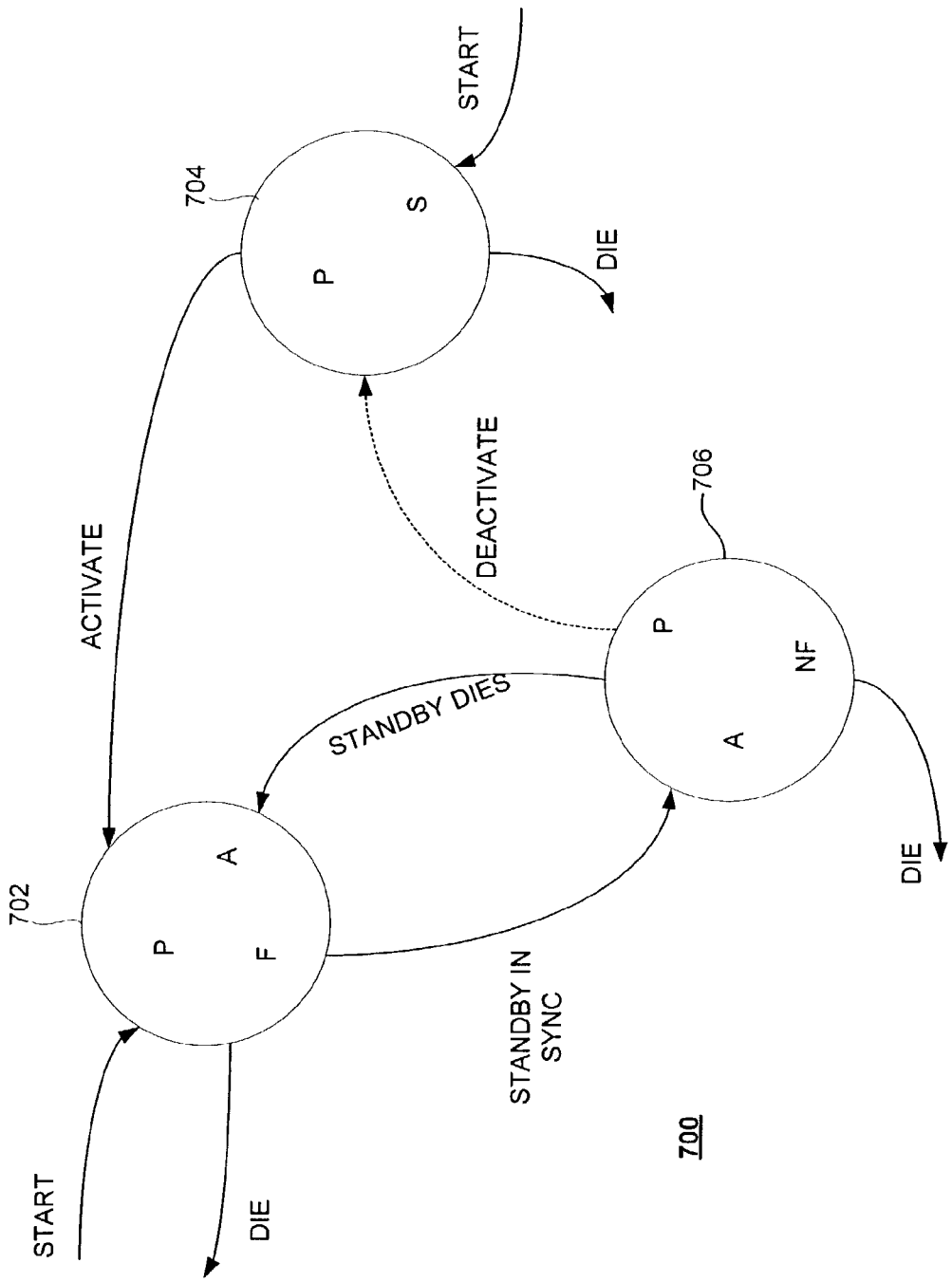
FIG. 7 depicts the states that can be assumed or which relate to an established connection.
Figure 8A:
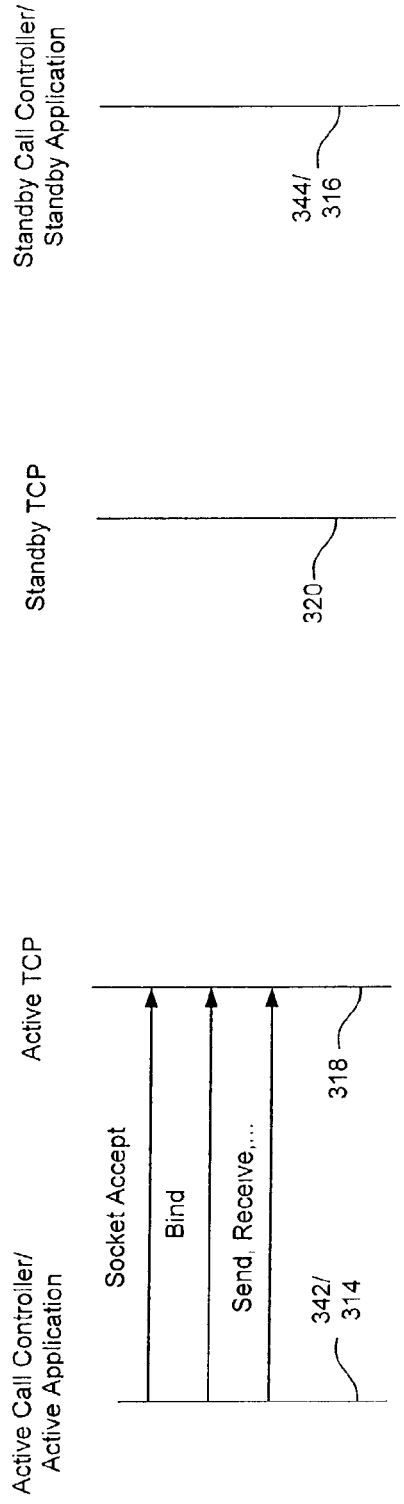
FIGS. 8(*a*) to 8(*d*) illustrate the signalling required of an embodiment to support the set-up and tear-down of active and stand-by connections.
Figure 8B:
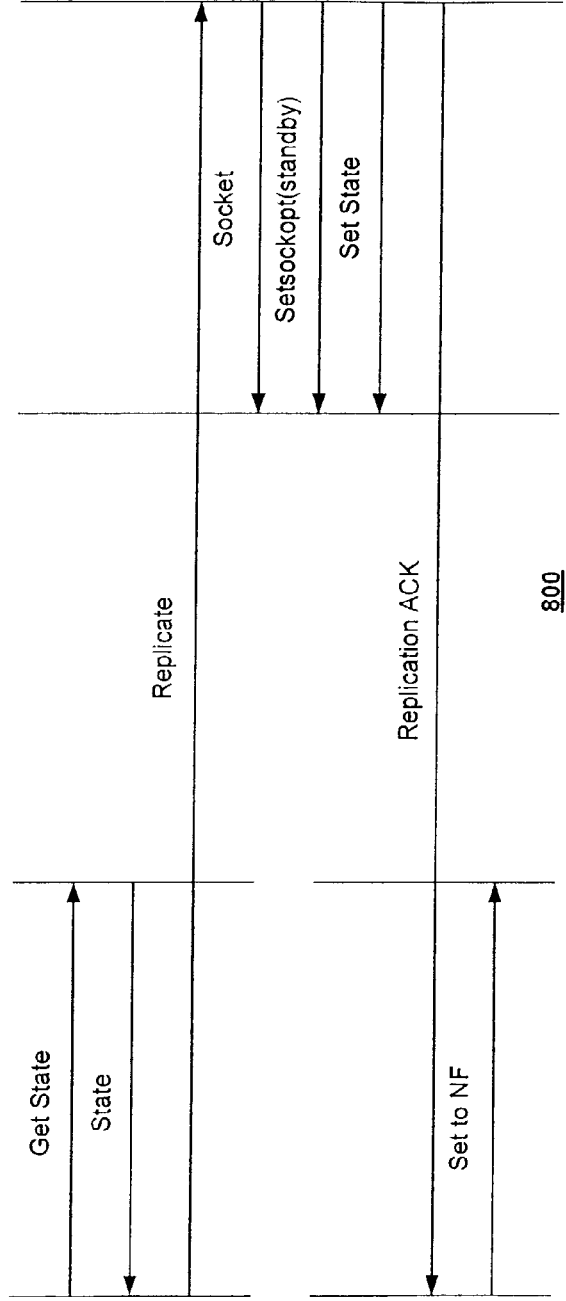
Figure 8C:
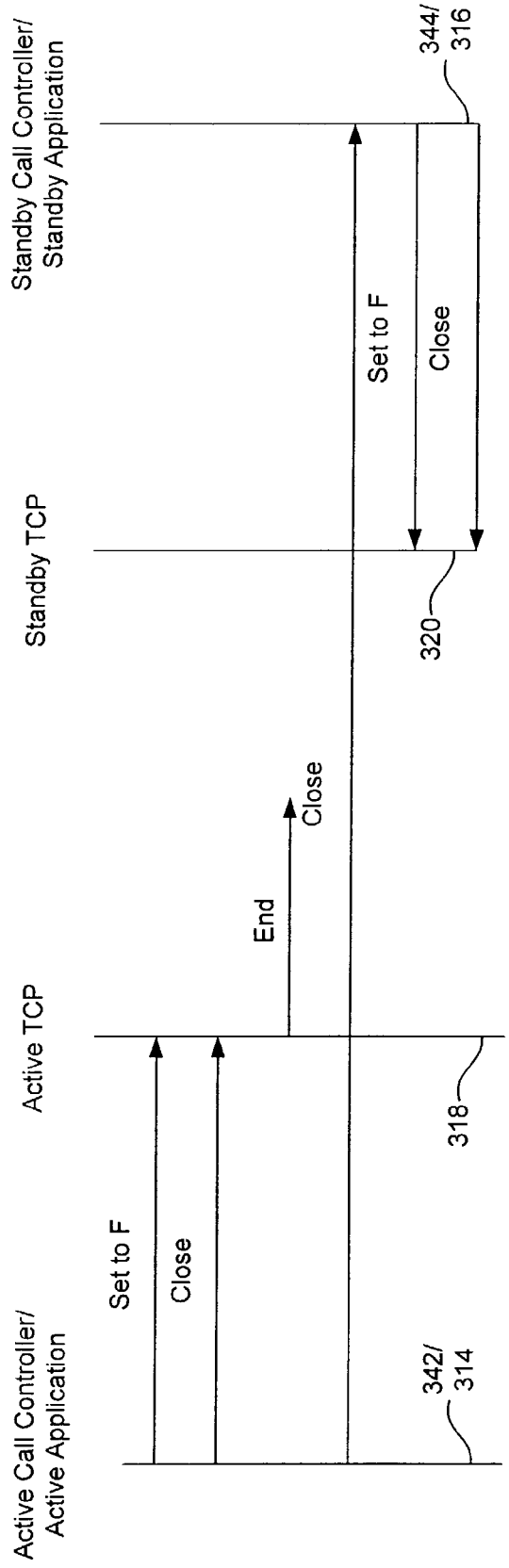
Figure 8D:
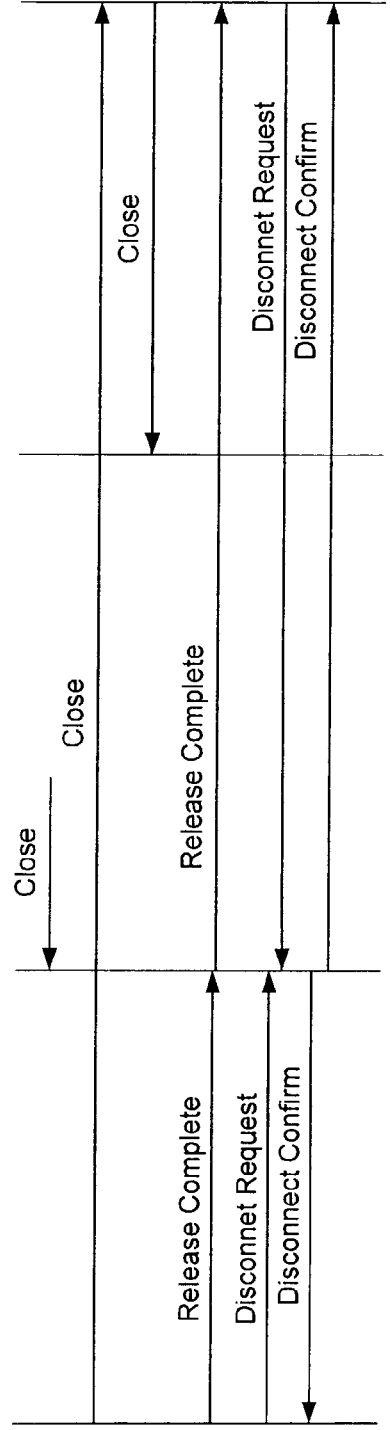

Referring to FIG. 7 there is shown a state diagram 700 that illustrates the different states a connection can have and the possible state transitions within both the active 302 and standby 304 gatekeeper hosts of those connections. The states and the transitions shown in FIG. 7 represent the states of the TCP connections from the point of view of the call controllers 314 and 316.

Each state of the connections can have the following properties attached to it:

P: when present in a state, indicates that the connection is a preserved connection (as opposed to a normal TCP connection, which does not support any TCP connection preservation extensions). All three states shown in FIG. 7 are preserved states.

A: when present in a state, indicates that the state is an active connection. An active state can carry out data transfer and has a special behaviour during a close operation as indicated by an F/NF flag.

S: when present in a state, indicates that the state is a standby connection. No packets are sent over such connections even when the connections are closed.

F: when present in a state, indicates that the TCP connection is terminated on the network with a peer TCP connection whenever it is locally closed. When combined with the A indicator as in state 604, the connection acts like a normal TCP connection.

NF: when present in a state, indicates that the TCP connection is not terminated with a peer TCP connection whenever it is locally closed upon explicit request or upon the death of a process. The appropriate local socket is merely purged. This option has no effect if the remote TCP peer initiates the termination of the connection. In such a case, the connection is effectively closed whatever the current option value. When combined with the A indicator as in state 706, the connection is an active connection that has a corresponding standby connection with which it is synchronised.

On top of the Q.931 layer 310 and 312 are the active and standby gatekeeper applications. The active and standby gatekeeper host applications may have corresponding applications or processes such as, for example, billing applications. The applications are known as the active application 342 and the standby application 344 according to whether they are executing or resident upon the active 302 or standby 304 gatekeeper hosts respectively.

When the active application 342 starts and before the standby application 344 has started and is synchronised, all the preserved connections opened by that active application 342 are in the active state 702. If the active application 342 dies, the TCP layer 318 will close any connections established with the standby gatekeeper host 304 since there is no standby application to assume or takeover connection processing.

During the synchronisation phase (to be described in greater detail below) the standby gatekeeper host 304 creates preserved standby connections and replicates the connection state information from the active gatekeeper host 302. When the synchronisation phase has been completed, the active gatekeeper host moves all of its preserved connections to the state 706 to ensure that the preserved TCP connections are not closed upon failure or death of a process. This allows the standby call controller to assume responsibility for processing connections after switchover. If an application desires to close a connection, the state of that application reverts to state 702. It will be appreciated that each application which runs above the Q.931 level follows these transitions. The call controller, which is situated between the TCP/IP level and the Q.931 level also follows these state transitions.

All standby connections are in state 704. When the standby connections are activated they are moved to state 702. Once a new standby system is restarted and synchronised, the standby connections can then be moved to state 706.

At the active gatekeeper, sockets are created using conventional socket calls including sockets( ), connect( ), bind( ), listen( ) and accept( ) calls. This is illustrated in FIG. 8(*a*) which shows the interaction between the active application and the active TCP layer 318. The active call controller 314 manages the active connections 346. The majority of the information that needs to be replicated between the active 302 and the standby 304 gatekeeper hosts is maintained within the TCP layers 318 and 320.

Throughout the pendancy of a call connection, or the operation of the active gatekeeper host 302, any changes at the IP 322 and TCP 318 levels are dynamically replicated to the stand-by gatekeeper. However, the replication need not take place immediately upon the transmission or receipt of a packet. It may be preferable to replicate the TCP context at judiciously selected moments when a connection or the active gatekeeper host 302 is in a stable state. A connection state is deemed to be stable when no traffic is being processed by the connection (i.e. the connection is idle). A TCP connection 346 is considered to be idle by the application 342 or call controller 314 if there is no pending outbound data and no received data waiting to be read by the application 342 or the call controller 314. Such an idle connection can be preserved using the techniques described herein.

When the application 342 determines that the connection is stable (i.e. the connection is idle), the data reflecting the TCP context may be replicated to the corresponding standby host by retrieving the state of each connection from the TCP layer 318 and sending that state information to the standby application 334. The replication manager module 346 creates a socket, configures that socket to be a standby socket and updates the newly created socket with the connection state information received from the active application 342.

The standby application 344 (or call controller 316) sends an acknowledgement to the active call controller 316 that the data has been received and replicated. The replicated data is stored in the replicated pending connections data 332. It can be seen that the above process is illustrated in FIG. 8(*b*).

It will be appreciated by one skilled in the art that the connection state data is obtained from the TCP layer 318 via the call controller 314 and transmitted to the corresponding layer, that is, call controller 316, of the standby gatekeeper host 304 via a local LAN connection 350.

While awaiting receipt of a replication acknowledgement signal, the connection, at the active call controller 314, remains in state 702. Once the replication acknowledgement signal has been received from the standby call controller, the active call controller 316 configures the socket so that the connection is never closed by placing it in state 706 as shown in FIG. 7.

It will be appreciated that if the connection replication to the standby call controller fails, this will not affect adversely the active connections 346 at the active gatekeeper host 302. This has the advantage of increasing the speed of execution of the replication process since the active application 342 is not suspended while awaiting the replication acknowledgement from the standby application 344. However, in other circumstances, it may be preferable to await receipt of the replication acknowledgement signal 802 to ensure that the established connections 346 are only used by the application 342 when they are or have been preserved by the standby application 344.

When the active application 342 or call controller 314 needs to close an active connection 346, that connection must firstly be configured by setting the connection state to 702. It is only after such configuration that the active connection 346 can be terminated. The termination operation is then replicated to the standby application 344 or standby call controller 316 which also closes its corresponding standby connection 348. It can be seen that this process is illustrated in FIG. 8(*c*).

If an active connection 346 is to be closed by one of the H.323 terminals or end points 102 or 104, the TCP layer processing proceeds as normal. The active application 342 replicates the close operation to the standby application 344. This process is illustrated in FIG. 8(*d*).

If the active application 342 unexpectedly terminates, the IP address assigned to it is migrated by the call controller 314 and, more particularly, by the replication manager module 334, to the standby gatekeeper host 304 before the standby application becomes active.

While, in some embodiments, the active gatekeeper host 302 may have only one IP address, in preferred embodiments, the active gatekeeper host may run a number of active applications (not shown) each of which will have a corresponding or dedicated IP address that is used by the processes of those applications. It will be appreciated that the IP address of an application is only active on the active gatekeeper host 302 which has the corresponding active application 342. During switch-over, the IP address is migrated from one gatekeeper host 302 to the new active gatekeeper host 304. Hence, the IP address is deactivated on the old gatekeeper host 302 and activated on the new or active gatekeeper host 304. The IP address is only active on one of the gatekeeper hosts at any one time.

Techniques for transferring an IP address from one MAC address to another are well known to those skilled in the art. A description of such a technique can be found in, for example, U.S. Pat. No. 6,049,825, the contents of which are incorporated herein for all purposes.

It will be appreciated that the states at the newly active gatekeeper are synchronised with the IP address migration such that, during switch-over, the stand-by processes become active only after the appropriate IP addresses are active. Conversely, the active processes only become standby processes after the IP address has been deactivated on the other gatekeeper.

The same can be achieved either by appropriate communication between the call controllers and the applications or by arranging for the applications to check the IP address status before activating any stand-by connection. It will be appreciated that standard API calls are available to check the status of an IP address.

Upon the death of a process, all file descriptors associated with that process will be closed. As the replicated active connections were not set to terminate the connection with a peer in accordance with state 706, the TCP layer 318 will not signal to the end points that the connection has been closed.

A monitoring process is provided which monitors the state of all highly available processes. The monitoring process detects the failure of the active host and provides an indication of that failure to the stand-by gatekeeper host. Therefore, concurrently, the stand-by gatekeeper host 304, which has been notified of the failure of the currently active gatekeeper host 302 by the monitoring process waits until the replicated IP address has been activated. Once a replicated IP address has been activated, the corresponding stand-by connections are activated as listening connections. After activation, the connections will remain in state 702 until a new stand-by system is restarted and synchronised. The new stand-by system may be a new process running on the old gatekeeper host 302 or may represent a re-boot of the old gatekeeper host 302. This process is illustrated in FIG. 9(*a*). In a preferred embodiment the processes shown in FIG. 9(*a*) take place while the gatekeeper host 304 or the newly active application 344 is in the activating state 610 as shown in FIG. 6.

When a stand-by socket goes active, the TCP layer 320 determines whether or not it is still in synchronisation with its TCP peer 318. If the old active TCP connection, prior to switch-over, had received data since the last synchronisation point, the stand-by TCP layer 320 will be out of synchronisation. Synchronisation is undertaken as part of the TCP stack and is a part of the TCP protocol. A determination of whether or not data has been received since the last synchronisation point is made every time a new message is received. In such a case, the current TCP connection is lost as are the associated calls, which, in practice, amounts to a mere 1% of all calls.

In the case of a manual switch-over, that is, a switch-over that was not provoked by the death of a process, for example, in the case of preventative maintenance or to allow hardware and/or software upgrades, the active application 342 or active call controller 314 deactivates all of its connections and assumes a stand-by status, while the stand-by application 344 and stand-by call controller 316 activate all associated connections and assume the roll of the active gatekeeper. Such a manual switch-over is schematically illustrated in FIG. 9(*b*). In the preferred embodiment, this process takes place during the stopping state 608 as shown in FIG. 6.

It will be appreciated by one skilled in the art that sockets which are required to perform a listening function do not need to be preserved as they do not form part of an active connection. To accommodate listening sockets established by the active application 342 or the active call controller 314, the stand-by process application 344 can adopt at least one of two strategies. Firstly, the stand-by application 344 can re-create the listening socket when it switches to an active process state. This re-creation can be achieved by executing the socket function sequence: sockets( ), bind( ), listen( ) and accept( ). Generally, this approach is considered to be the safest and simplest. Alternatively, however, the stand-by process could create a listen socket and bind the newly created listen socket to any IP address (IP address=INADDR_ANY) and a specified port number. It will be appreciated that this approach would save the steps of re-creating the listening socket. However, the stand-by process would then have to handle the possibility of connection requests when it is still in stand-by mode for an IP address active on the other Gatekeeper 302.

If a TCP connection 346 is not idle at the time a switch-over occurs, the TCP connection 346 will be terminated and it will need to be re-established or re-created by one of the end points. Any such newly established connection will be processed as such by the gatekeeper running on the newly active gatekeeper host.

In a preferred embodiment an extended socket Application Programming Interface (API) is provided to allow the applications 342 and 344 and the call controllers 314 and 316 to control the connection properties, retrieve any connection states from the active gatekeeper host 302 and to replicate those connection states and properties at the stand-by gatekeeper host 304. This API may be conveniently implemented in the form of the connection manager modules 338 and 340 and the replication manager modules 334 and 336 of the call controllers 314 and 316.

Preferred embodiments consist of the additions to a standard HP-UX socket and related calls. In particular, the getsockopt( ) is extended to return the TCP state information required to build a similar connected/established socket. This call can be invoked on an active or stand-by socket and is a read only operation that does not effect the socket or the connection. The same call is used to effect a transition from state 706 to 702 and visa versa.

The nature of the state information will vary according to the platform from which the gatekeeper hosts 302 and 304 are formed. The state information is selected to enable a stand-by socket to be up-dated with the state information to be used by the stand-by call controller 316 and/or application 344, when activated, without a connection needing to be re-opened over the network 106.

The setsockopt( ) call is extended to enable resynchronisation of a stand-by socket with the TCP state information obtained from an active socket. This method should only be invoked on a stand-by socket and it effects all TCP layers. The setsockopt( ) call is performed after a socket( ) call to create a stand-by socket connection. It is invoked on an active connection to cause it to transition to a de-active state. Conversely, the setsockopt( ) can be invoked on a stand-by connection to cause it to transition to an active state.

Referring back to FIG. 3, in a preferred embodiment, the connection manager modules 338 and 340 maintain a record of all open connections 346 and their associated state information in a convenient place. The connection manager modules 338 and 340 can perform operations on multiple connections simultaneously, that is, they are able to close all connections, replicate all connections and activate/deactivate all connections substantially simultaneously. The connection manager modules 338 and 340 can set a special flag within the connections to indicate whether or not that connection has been replicated. It will be appreciated that a simple traversal over the pending connections data 326 is then sufficient to change the replicated status of a connection. Preferably, the connection manager modules 314 and 316 execute on different threads to the applications 342 and 344 to avoid suspending execution of the latter for long periods while replicating, activating or retrieving the state of connections used by the applications 342 and 344. The active application triggers the replication process so that the call controller 314 retrieves the TCP connection states and transmits them to the stand-by gatekeeper host.

Although the above embodiments have been described with reference to an IP telephony service, it will be appreciated by those skilled in the art that the end points may equally well be Gateways or Multipoint Control Units. As is appreciated by those skilled in the art, a Gateway provides connectivity between an H.323 network and a non-H.323 network. For example, a Gateway can connect and support communication between an H.323 terminal and an SCN network, which includes all switched telephony networks such as a public switch telephone network (PSTN). The connectivity between any such dissimilar networks is achieved by translating protocols for call set-up and release, converting media formats between different networks and transferring information between networks connected by the Gateway. However, it will be appreciated that a Gateway is not essential for communication between two terminals on an H.323 network. An MCU is used to support conferences between three or more H.323 terminals. All terminals participating in the conference establish a connection with the MCU. The MCU manages conference resources, negotiates between terminals to determine the audio and video codecs needed to support the conference and may also handle the media stream. While the Gatekeepers, Gateways and MCUs are logically separate components of the H.323 standard they can be implemented as a single physical device.

It will be appreciated that although the above embodiments have been described with reference to physically separate active and stand-by H.323 gatekeepers hosts, that the present invention is not limited to such arrangements. Embodiments can equally well be realised in which the invention is applied to other signalling protocols providing that the underlying networking layers do not tear-down the call upon failure or hand-over. For example, embodiments can be realised in which SS7's ISUP protocol is used. It will be appreciated that call models of the form "call set-up", "call active" and "call tear-down", that is, models in which the next signal in the call active state is most likely to be a call tear-down signal, can benefit from the present invention. In essence, embodiments of the present invention enable one to preserve a significant percentage of established calls without the need to preserve call contexts at the signalling protocol level upon failure. Such preservation is only required for network layers below the signalling protocol.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of processing a data connection for exchanging data between two communication devices within a fault tolerant apparatus having an active host and a stand-by host; the active host being arranged to support a communication protocol stack comprising at least a first protocol layer, providing connection management signals, for establishing and managing the data connection between the two communication devices, including a disconnect signal for terminating the data connection, and a second protocol layer having an associated connection context; the first protocol layer being at a higher level within the communication protocol stack relative to the second protocol layer; the method comprising:

establishing a data connection between the two communication devices using at least the connection management signals of the first protocol layer and establishing a connection context for the second protocol layer;

replicating the connection context of the second protocol layer to the stand-by host; implementing the communication stack protocol on the standby host in response to detection of an event associated with the active host;

receiving, at the standby host, from one of the two communication devices, an associated connection management signal other than a disconnect signal; and issuing to at least one of the two communication devices a disconnect signal in response to receipt of the associated call management signal.

2. A method as claimed in claim 1, further comprising terminating the data connection at one or both of the two communication devices in response to receiving the disconnect signal issued by the fault tolerant apparatus.

3. A method as claimed in claim 1 in which establishing the connection context comprises storing at least one of data relating to a signalling connection between the apparatus and at least one of the two communication devices and data relating to the data connection between the two communication devices.

4. A method as claimed in claim 3, in which the data connection between the two communication devices is supported using a network element other than the fault tolerant apparatus.

5. A method as claimed in claim 1, in which the first protocol layer is an H.323 layer.

6. A method as claimed in claim 1, in which the second protocol layer is a packet-based protocol layer.

7. A method as claimed in claim 6 in which the second protocol layer is a TCP layer.

8. Apparatus for processing a data connection for exchanging data between two communication devices within a fault tolerant apparatus having an active host and a stand-by host; the active host being arranged to support a communication protocol stack comprising at least a first protocol layer, providing connection management signals, for establishing and managing the data connection between the two communication devices, including a disconnect signal for terminating the data connection, and a second protocol layer having an associated connection context; the first protocol layer being at a higher level within the communication protocol stack relative to the second protocol layer; comprising:

an arrangement for establishing a data connection between the two communication devices using at least the connection management signals of the first protocol layer and establishing a connection context for the second protocol layer;

an arrangement for replicating the connection context of the second protocol layer to the stand-by host;

an arrangement for implementing the communication stack protocol on the standby host in response to detection of an event associated with the active host;

an arrangement for receiving, at the standby host, from one of the two communication devices, an associated connection management signal other than a disconnect signal; and a controller for issuing to at least one of the two communication devices a disconnect signal in response to receipt of the associated call management signal.

9. Apparatus as claimed in claim 8, adapted for terminating the data connection at one or both of the two communication devices in response to receiving the disconnect signal issued by the fault tolerant apparatus.

10. Apparatus as claimed in claim 8 in which the arrangement for establishing the connection context comprises a store for storing at least one of data relating to a signalling connection between the apparatus and at least one of the two communication devices and data relating to the data connection between the two communication devices.

11. Apparatus as claimed in claim 10, in which the data connection between the two communication devices is supported using a network element other than the fault tolerant apparatus.

12. Apparatus as claimed in claim 8, in which the first protocol layer is an H.323 layer.

13. Apparatus as claimed in claim 8, in which the second protocol layer is a packet-based protocol layer.

14. Apparatus as claimed in claim 13 in which the second protocol layer is a TCP layer.

\* \* \* \* \*